US008719918B2

(12) United States Patent
Wen et al.

(10) Patent No.: US 8,719,918 B2
(45) Date of Patent: May 6, 2014

(54) METHOD AND DEVICE FOR DISTRIBUTED SECURITY CONTROL IN COMMUNICATION NETWORK SYSTEM

(75) Inventors: Haibo Wen, Shanghai (CN); Chunyan Yao, Shanghai (CN); Jun Zheng, Tianjin (CN); Songwei Ma, Shanghai (CN)

(73) Assignee: Alcatel Lucent, Paris (FR)

( * ) Notice: Subject to any disclaimer, the term of this patent is extended or adjusted under 35 U.S.C. 154(b) by 280 days.

(21) Appl. No.: 13/003,430

(22) PCT Filed: Jun. 16, 2009

(86) PCT No.: PCT/CN2009/000659
§ 371 (c)(1),
(2), (4) Date: Jan. 10, 2011

(87) PCT Pub. No.: WO2010/017683
PCT Pub. Date: Feb. 18, 2010

(65) Prior Publication Data
US 2011/0119737 A1    May 19, 2011

(30) Foreign Application Priority Data

Aug. 15, 2008  (CN) .......................... 2008 1 0041784

(51) Int. Cl.
*H04L 29/06* (2006.01)
*G06F 21/00* (2013.01)
(52) U.S. Cl.
USPC .............................. 726/14; 713/154; 380/270
(58) Field of Classification Search
None
See application file for complete search history.

(56) References Cited

U.S. PATENT DOCUMENTS

| 7,434,254 B1* | 10/2008 | Foschiano et al. ............... 726/13 |
| 7,551,559 B1* | 6/2009 | Jonnala et al. ................. 370/230 |
| 2004/0193912 A1* | 9/2004 | Li et al. .......................... 713/200 |

(Continued)

FOREIGN PATENT DOCUMENTS

| CN | 1852299 A   | 10/2006 |
| CN | 101087187 A | 12/2007 |
| EP | 0 658 837   | 6/1995  |
| GB | 2 388 498   | 11/2003 |

OTHER PUBLICATIONS

International Search Report.

(Continued)

*Primary Examiner* — Gilberto Barron, Jr.
*Assistant Examiner* — Malcolm Cribbs
(74) *Attorney, Agent, or Firm* — Harness, Dickey & Pierce (57) ABSTRACT

With migration of network technology and more and more requirements of user equipment for accessing to Internet, the network security faces more and more severe situation. There is provided a method for distributed security control in communication network system and the device thereof in order to improve security and operatability of network operator. In the method, firstly the network controller establishes a network security control mechanism, which is used for a second network device to check the validity of the data package from the user equipment; secondly, the network controller sends the network security control mechanism to the second network devices; lastly, the second network device checks the validity of the data package from the user equipment according to the network security control mechanism, and discards the data package if the data package is invalid. With the present invention, security and operatability of the communication network may be improved greatly, particularly, the functionality of address anti-spoofing can be implemented in the network with a WLAN architecture in centralized control.

13 Claims, 3 Drawing Sheets

(56) References Cited

U.S. PATENT DOCUMENTS

| | | |
|---|---|---|
| 2005/0060434 A1* | 3/2005 | Fazal et al. .................... 709/247 |
| 2006/0161770 A1 | 7/2006 | Goto et al. |
| 2008/0098473 A1 | 4/2008 | Liu et al. |
| 2009/0150665 A1* | 6/2009 | Kaippallimalil et al. ..... 713/153 |

OTHER PUBLICATIONS

Wei Zhuang, "The Research of Mobile Communication Soft Switching Network Security Mechanism" Full-text Database of Excellence Master Dissertation of China, Jul. 15, 2008, pp. 12-27.

Search Report for corresponding European Application No. 09806286.2 dated Apr. 5, 2012.

* cited by examiner

Figure5

METHOD AND DEVICE FOR DISTRIBUTED SECURITY CONTROL IN COMMUNICATION NETWORK SYSTEM

FIELD OF THE INVENTION

Present invention relates to a security control of communication network system, more particularly to a method and device for distributed security control in communication network system.

BACKGROUND OF THE INVENTION

As migration of network technology and more and more requirements of user equipment for accessing to Internet, higher requirement for security and operatability is brought up by operators. And specially, it becomes more of an issue about how to establish and execute the network security controlling mechanism on the network device of wireless termination device.

With the technical development tendency of Fixed Mobile Convergence (FMC), Wireless LAN (WLAN) will play an important role, especially in the case of combination 802.11 WLAN with Digital Subscribe Line (DSL), wherein, Centralized WLAN architecture, defined by Control And Provisioning of Wireless Access Points (CAPWAP) working group of Internet Engineering Task Force (IETF), is a preferable deployment solution as of now. Under this architecture, Wireless Termination Point (WTP) and Access Controller (AC) communicate, forward control information and data information between each other by the protocol of CAPWAP.

In the prior art (for example, the current CAPWAP protocol in RFC4118), wireless termination device only applies validity checking to source MAC address of data package from the user equipment in WLAN, thus causing an inability that it can not be prevented that some malicious user equipments send, by utilizing the IP address of other user equipments, numerous malicious data package to the wireless termination device or even the access node equipment so as to attack the network (for example, DoS attack, Denial of Service). Therefore, network termination device plays a limited part in the aspect of the network security control in the prior art, without network security control functionality such as the IP address anti-spoofing and so on. Additionally, in the prior art, access controller does not provide in a real-time mode the configuration of parameters applicable to network security control, such as IP address, to the network device such as wireless termination device and so on, thus further limits that the wireless termination device, which is of a network device more close to user equipment, plays a more important role in network security control, and limits the security of the whole communication network system. In fact, with migration of network and technology development, it has become one of the important feasible approaches of enhancing the security of the whole communication network system to allow those network device more close to user equipments play more part in network security control.

SUMMARY OF THE INVENTION

The present invention is provided to allow the network device closer to the user equipment, such as wireless termination device in the prior art, to play more role in network security control. In the present invention, there is provided a method of distributed security controlling in the communication network system, with network controller and second network device involved, wherein, the network controller is responsible for dynamically establishing network security control mechanism and applying the configuration of the established network security control mechanism to the second network device; while the second network device is responsible for parsing and implementing network security control mechanism, and checking the validity of the received data package and conduct the corresponding processing, so as to ensure the network security.

According to a first aspect of the invention, there is provided a method for distributed security control in a communication network system, the communication network comprises a network controller and one or more second network devices, and one or more user equipments; firstly, the network controller dynamically establishes a network security control mechanism, used for the one or more second network devices to check the validity of the data package from the user equipment; secondly, the network controller sends the network security control mechanism to the one or more second network devices; lastly, the one or more second network device checks the validity of the data package from the user equipment according to the network security control mechanism and discards the data package if the data package is not in accord with the network security control mechanism.

According to a second aspect of the invention, there is provided a method, in a network controller of a communication network system, for instructing one or more second network devices of the communication network system to perform distributed security control, wherein, the communication network system further comprises one or more user equipments, in the method, the network controller firstly establishes network security control mechanism, used for the one or more second network devices to check validity of the data package from the user equipment; secondly sends the network security control mechanism to the one or more second network devices.

According to a third aspect of the invention, there is provided a method, in a second network device of a communication network system, for performing distributed security control, wherein, the communication network further comprises a network controller and one or more the second network devices, and one or more user equipments, in the method, the second network device firstly receives a network security control mechanism from the network controller; and secondly checks, according to the network security control mechanism, validity of the data package from the user equipment; and discards the data package if the data package is not in accord to the network security control mechanism.

According to a fourth aspect of the invention, there is provided a device, in a network controller of a communication network system, for instructing one or more second network devices in a communication network system to perform distributed security control, and the communication network system further comprises one or more user equipments, and the device comprises an establishing device and a configuration device, wherein, the establishing device is used for establishing a network security control mechanism for the one or more second network devices to check validity of the data package from the user equipment; and the configuration device is used for sending the network security control mechanism to the one or more second network devices.

According to a fifth aspect of the invention, there is provided a device, in a second network device of a communication network system, for performing distributed security control, wherein, the communication network further comprises a network controller and one or more the second network devices, and one or more user equipments, and the device comprises a configuration device and a checking device, wherein, the configuration device is used for receiving the network security control mechanism from the network controller; and the checking device is used for checking, according to the network security control mechanism, validity of data package from the user equipment; and discarding the data package if the data package is not in accord to the network security control mechanism.

By utilization of the method and device of the present invention, with the collaboration between network controller and second network device in the communication network, validity checking is applied to the data package transmitting via second network device, therefore improving the security of communication network. At the same time, due to the dynamic establishment of network security control mechanism on the network controller, not only network security checking rule but also network security checking parameter can be changed dynamically, thus improves the capability, of network security control, in the network device closer to the user equipment, such as wireless termination device, and improves overall security of the whole communication network system.

BRIEF DESCRIPTION OF THE DRAWINGS

Other features, aspects and advantages of the present invention will become more obvious by reading the following description of non-limiting embodiments with the aid of appended drawings.

Wherein, same or similar reference numerals refer to the same or similar device (module) or step of method.

DETAILED DESCRIPTION OF EMBODIMENTS

Figure 1:
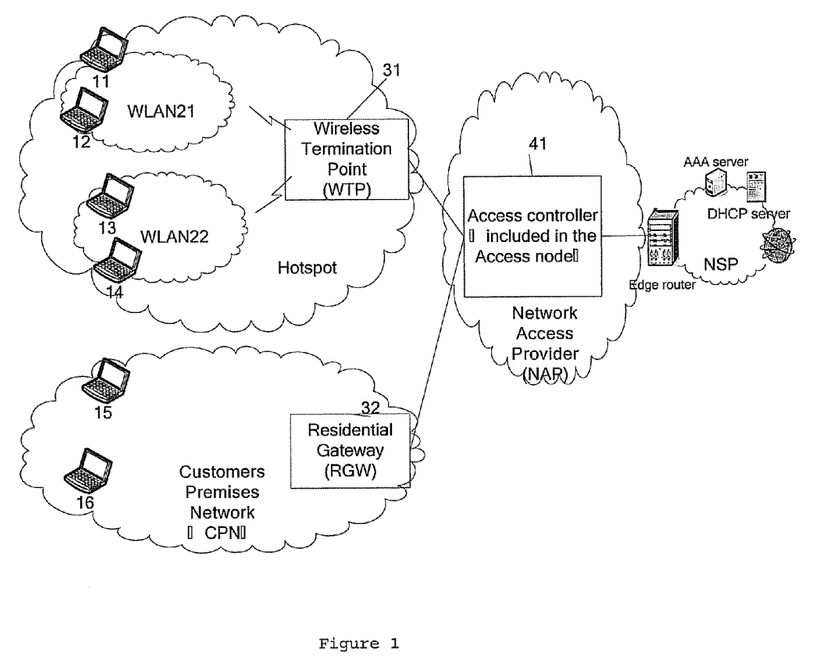
FIG. 1 illustrates the network topology schematic diagram of a communication network system according to one embodiment of the present invention.

In the network topology schematic diagram of Network Access Provider (NAP) in an embodiment of a communication network system as shown in FIG. 1, the access controller (AC) 41 of the Network Access Provider is contained in Access Node, and the access controller is connected to one or more wireless termination devices (WTP) 31 or one or more Residential Gateways (RGW). Every wireless termination device 31 is permitted to have one or more WLANs in control, wherein each WLAN further comprises one or more wireless user equipments; while each Residential Gateway 32 is connected with one Customers Premises Network (CPN), wherein each Customers Premises Network further comprises one or more user equipments. The other end of the access node is connected to network devices such as edge routers and so on, thus is further connected to one or more networks of Network Service Providers (NSP).

Figure 2:
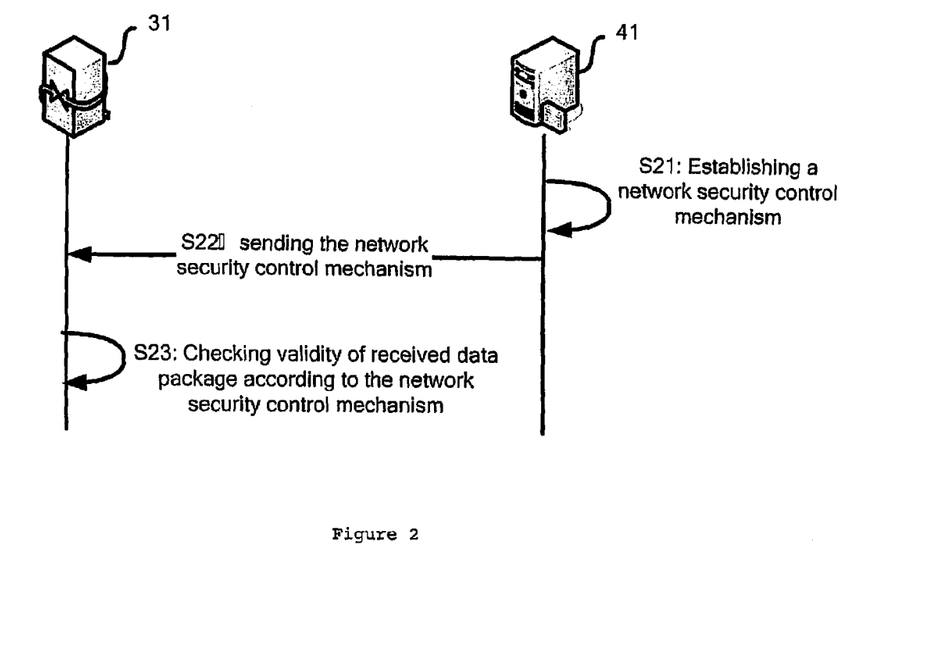
FIG. 2 illustrates the message flow chart of a method of distributed network security control according to one embodiment of the present invention.

FIG. 2 illustrates the message flow chart of a method of distributed network security control according to one embodiment of the present invention. And detailed description will be made to the embodiment of the present invention as shown in FIG. 2, with FIG. 1 in combination therewith.

In the access network as shown in FIG. 1 as one embodiment of communication network system, the access controller 41 is one network controller therein, while the wireless termination device 31 or the Residential Gateway 32 is two network devices therein, which are collectively referred to as "second network device" herein.

Firstly, as a network controller, the access controller 41 establishes, by step S21, a network security control mechanism. Such a network security control mechanism is used for checking the validity of the received data package in one or more wireless termination devices, especially for checking the validity of the data package from the user equipment of the WLAN or Customers Premises Network of Hotspot, so as to detect invalid data packages and ensure the network security.

Wherein, preferably, the network security control mechanism comprises network security checking rules and network security checking parameters. For instance, in one embodiment of the network security control mechanism, the network security checking rules comprise "checking if address pair combination of source network layer address and source data link layer address of a data package is a predetermined address pair combination of network layer address and data link layer address", while the network security checking parameters further comprise those predetermined address pair combination of IP addresses and MAC addresses. For example, in correspondence with the above network security checking rule, one instantiation of network security checking parameters is as shown in Table 1.

TABLE 1

| One Instantiation for network security checking parameter | | |
|---|---|---|
| predetermined address pair combination of IP address and MAC address | IP address | MAC address |
| combination 1 | 172.10.112.1 | 44-45-53-54-00-10 |
| combination 2 | 172.10.112.2 | 44-45-53-54-00-20 |
| combination 3 | 172.10.112.3 | 44-45-53-54-00-30 |

The network security checking parameters as shown in Table 1 comprise three predetermined address pair combinations of IP address and MAC address, namely, combination 1, combination 2, combination 3, which are respectively (172.10.112.1, 44-45-53-54-00-10), (172.10.112.2, 44-45-53-54-00-20), and (172.10.112.3, 44-45-53-54-00-30). If the network security checking rule of network security control mechanism is "checking if the address pair combination of source network layer address and source data link layer address of data package is the predetermined address pair combination of network layer address and data link layer address" and the network security checking parameters contained in the network security control mechanism are as shown in Table 1, it is represented that the data package is in accord with the network security control mechanism and is valid only when the address pair combination of source IP address and source MAC address of data package received by wireless termination device 31 from the user equipment is one of the above three combination pairs; otherwise, the data package is invalid hence potentially threatens network security. Exception handler should be applied to data package not in accord with network security control mechanism, for example, discarding those kind of invalid data package.

In addition, optionally, the network security checking parameter as shown in Table 1 may also correspond to different network security checking rules. For example, the operator or manager of the communication network system lowers the checking level of network security checking rule due to trust in some Customers Premises Networks or WLAN or some agreements signed therebetween, namely changes the above network security checking rule of "checking if the address pair combination of source network layer address and source data link layer address of the data package is the predetermined address pair combination of the network layer address and data link layer address" into "checking if the source network layer address of data package is the predetermined network layer address". Herein, if the network security checking parameter is still as shown in Table 1, a data package is valid when the source IP address of the data package received by wireless termination device 31 from the user equipment is one of the IP addresses of the address pair combination 1, combination 2, and combination 3 as shown in Table 1, namely, for example, if the source IP address of one data package is 172.10.112.2, then it is deemed, regardless of the MAC address thereof, that the data package is in accord with the above network security control mechanism and the data package is valid; however, if the source IP address of one data package is 172.10.112.4, the data package is invalid for the reason that 172.10.112.4 is not an IP address among the three address pair combinations as shown in Table 1.

Preferably, the access controller 41 may establish the foregoing network security control mechanism when the device of the wireless termination device 31 or the Residential Gateway 32 connects to it, or otherwise have a setting that the establishment of corresponding network security control mechanism is triggered by other network event. Such network event comprises:

the access controller 41 receives an instruction of establishing the network security control mechanism from other device (for example a configuration server) in the communication network system; preferably, such instruction includes information about network security control which is used for aiding the access controller 41 to establish the corresponding network security control mechanism; more preferably, such instruction even directly includes the network security checking rule of the network security control mechanism.

the access controller 41 receives the information about network security alarming, sent by other device (for example, alarming server) in the communication network system; preferably, the access controller 41 selects, depending on the difference of the received alarming information, the corresponding network security checking rules and the corresponding network security checking parameter when establishing the network security control mechanism. For instance, when receiving alarming information of occurrence of DoS network attack for relevant network device, the access controller 41, as the establishing network security control mechanism, may select "checking if the address pair combination of source network layer address and source data link layer address of data package is the predetermined address pair combination of the network layer address and data link layer address" as the network security checking rule; while upon the occurrence of alarming information that some network device undergoes attack of TCP/UDP port number, the access controller 41, as establishing the network security control mechanism, may select "the combination of network layer address and TCP/UDP port number" as the network security checking parameter.

the access controller 41 detects network information such as DHCP address allocating message for user equipment; herein, in the case that the access controller 41 has previously established network security control mechanism for wireless termination device 31 with the user equipment belonging thereto, then the access controller 41 may update the established network security control mechanism. If the network security control mechanism hasn't been established, the access controller 41 establishes the corresponding network security control mechanism.

Preferably, the network security checking rule and the network security checking parameter may update self-adaptively along with the operation of communication network system. For instance, when the current communication network system needs to improve the network security control level, it may trigger the adjustment for different network security checking rule. In addition, in the course of operation of the communication network system, as described hereinabove, when the same user equipment, within WLAN or Customers Premises Network, obtain such configuration information such as a different IP address by assignment of the DHCP server and so on via DHCP protocol, it may also trigger the adjustment for different network security checking parameter. For instance, after the user equipment, with a MAC address of 44-45-53-54-00-30, requests the DHCP server for reassignment of address, its IP address changes from the original 172.10.112.3 into 172.10.112.30, then the combination 3 in Table 3 updates correspondingly from (172.10.112.3, 44-45-53-54-00-30) into (172.10.112.30, 44-45-53-54-00-30).

It can be seen that, as the operation of communication network system, the network security control mechanism including the network security checking rule and the network security checking parameter may be adjusted timely adjusting the network security checking rule and/or the network security checking parameter, hence be quickly adapted for the requirement from current network security control and response timely to the occurrence of the event such as network security alarming and so on, so as to maintain the network security better.

In addition, preferably, according to different objectives of the network security control, the established network security control mechanism may include different network security checking parameter. For instance, in order to avoid network attack to some TCP/UDP ports, as shown in Table 2, another embodiment of network security checking parameter comprises the combination of IP address and TCP/UDP port number:

TABLE 2 another specific example for network security checking parameter

| Predetermined Combination of IP address and port number | IP address | port number |
|---|---|---|
| Combination 1 | 172.10.112.1 | 81 |
| Combination 2 | 172.10.112.2 | 82 |
| Combination 3 | 172.10.112.3 | 83 |

In correspondence to the network security checking parameter as shown in Table 2, one embodiment for network security checking rule may be "checking if the combination of source network layer address and port number of data package is the predetermined combination of the network layer address and port number", namely, it is represented that the data package is valid only when the combination of source IP address and port number of the data package is one of the three combinations as shown in Table 2, otherwise the data package is invalid.

It should be noted that, according to different objectives of network security control, and in combination with different network security checking rule, the network security checking parameter further comprises the parameters such as network layer address and port number, or the combination of the parameters such as network layer address and port number. Certainly, other possible parameter form can be contained therein, such as IPv6 address for IPv6 network or the network Prefix for IPv6 address and the like.

In addition, the network security checking parameter included in the network security control mechanism may be configured for access controller not only in the manner of manual configuration, but also, preferably, in the manner that the access controller obtain the above checking parameter by auto detection of the address allocating message transmitted from network address allocating server of DHCP server to the user equipment of WLAN or Customers Premises Network. For instance, when the user equipment in the WLAN request DHCP server for an IP address via DHCP protocol, the access controller may detect the DHCP ACK message transmitted from DHCP server to the corresponding user equipment, and obtain the IP address assigned to the corresponding user equipment and the MAC address of the user equipment, hence form a predetermined address pair combination of the network layer address (IP address) and data link layer address (MAC address), which may serves as one predetermined address pair combination of the network security checking parameter as shown in Table 1, and finally send the network security control mechanism including above network security checking parameter to wireless termination device 31 managing the WLAN. As for the parameter of TCP/UDP port number and so on, user equipment may obtain them as establishing TCP/UDP connection by means of service authentication, and herein, the authentication server can automatically inform the network controller such as access controller via management system of the communication network system, hence allow the access controller to automatically obtain the parameter of TCP/UDP port number and so on, and to finally establish the network security checking parameter.

Additionally, in the course of establishment of the network security control mechanism in step S21, the access controller may also obtain the corresponding information of network security checking rule and/or network security checking parameter and so on by means of manual configuration or other configuration-by-server manner. Preferably, the network security checking rule is obtained by means of manual configuration or other configuration via configuration-server, while the network security checking parameter is obtained automatically by the access controller in the course of operation of communication network system, for example, the parameter such as IP address is obtained by the detection of the DHCP ACK message for address allocating in DHCP protocol.

As of here, the access controller establishes the network security control mechanism by step S21, and the network security control mechanism may be applicable to network devices such as the wireless termination device 31 or the Residential Gateway 32 and so on, to check the validity of the data package from the user equipment.

Figure 5:
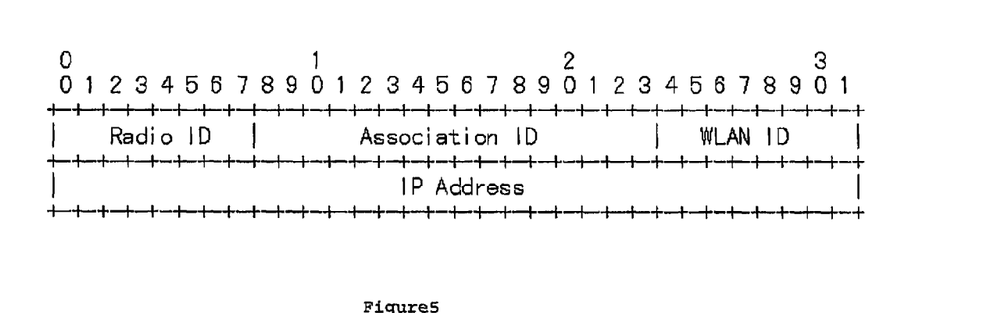
FIG. 5 illustrates a message elements including IP address used in an extended CAPWAP protocol message according to one embodiment of the present invention.

Subsequently, the access controller will transmit, by step S22, the network security control mechanism established in step S21 to the corresponding wireless termination device 31. Preferably, the access controller 41 transmits, by the CAP-WAP (Control And Provisioning of Wireless Access Points) protocol message, the above network security control mechanism to the corresponding wireless termination device 31. For example, the access controller may transmit, by the CAPWAP Station Configuration Request message in CAPWAP protocol, the network security control mechanism to the wireless termination device 31. Wherein, when the network security checking parameter included in the network security control mechanism comprises an IP address, as a embodiment that extends the current version CAPWAP protocol, the CAPWAP Station Configuration Request message comprises a message element as defined in FIG. 5, and the message element specifically comprises a 8-bit Radio ID, a WLAN ID, a 16-bit IEEE802.11 association identifier (AID) and a 32-bit IP address (or a 128-bit IPv6 address in case of the IPv6 protocol).

Finally, after receiving the above network security control mechanism by step S22, the wireless termination device 31 checks, in step S23, the validity of data package from the user equipment in WLAN, and discards the data package if the data package is not in accord with the network security control mechanism.

Specifically, the wireless termination device 31 firstly obtains, from the data package from the user equipment in WLAN, the parameter information corresponding to the data package according to the received network security control mechanism. For example, when the network security checking rule is "checking the address pair combination of source network layer address and source data link layer address of the data package is the predetermined address pair combination of the network layer address and data link layer address", and the network security checking parameter is as shown in Table 1, the wireless termination device 31 firstly obtains, from the data package from user equipment, the source IP address and source MAC address of the data package, and forms an address pair combination, namely (the source IP address of the such package, the source MAC address of data package); subsequently, contrasts the acquired address pair combination of the data package to the network security checking parameter according to the network security checking rule: if the address pair combination of the data package is one of the predetermined address pair combination included in the network security checking parameter, the validity of the data package is represented, otherwise, the data package is invalid. For example, the source IP address acquired from a data package from a user equipment is 172.10.112.2, and the source MAC address therefrom is 44-45-53-54-00-20, namely the parameters information of the data package is the address pair combination (172.10.112.2, 44-45-53-54-00-20) of source network layer address and source data link layer address, then according to the network security checking rule, it is determined that the address pair combination of data package is the same with combination 2 in predetermined address pair combination of network layer address and data link layer address in the network security checking parameter as shown in Table 2, thus it is determined that the data package is in accord with the network security control mechanism, hence the data package is valid. However, if the source IP address of another data package is 172.10.112.2, with the source MAC address being 44-45-53-54-00-30, namely the parameters information of the data package is the address pair combination (172.10.112.2, 44-45-53-54-00-30) of source network layer address and source data link layer address, then it is determined, according to the network security checking rule, that the address pair combination of the data package differs from any of the three predetermined address pair combinations of network layer address and data link layer address included in the network security checking parameter as shown in Table 1, so as to determine that the data package is not in accord with the network security control mechanism, hence representing invalidity of the data package, and the wireless termination device 31 should handle the data package in a exceptional way, for example discarding the data package. Actually, by the above exemplarily described execution of the network security control mechanism on the wireless termination device, the behavior of network attack from some malicious user equipments by means of IP address embezzlement of the other user equipment(s) and sending numerous IP packages can be effectively avoided. That is, only those data packages, with the same address pair combinations of source IP address and source MAC address as the predetermined address pair combination, could go through the wireless termination device 31 and be forwarded to the network device such as the access controller 41 and so forth, thus achieving the goal of IP address anti-spoofing.

Additionally, the wireless termination device 31 may acquire, out of data package from the user equipment, not only the parameter of the source IP address, but also the parameter of TCP/UDP port number, destination IP address, destination MAC address and so forth. In implementation of the present invention, the network security checking parameter may be configured by selecting one or the combination of a plurality of the parameters according to different objective of network security control.

Those skilled in the art should readily appreciate that, the foregoing steps and method executed in the wireless termination device is also applicable to the Residential Gateway 32. However, since the CAPWAP protocol is generally applied between the access controller and the wireless termination device, in normally cases the access controller does not transmit network security control mechanism to the residential Gateway in the form of CAPWAP protocol message.

Figure 3:
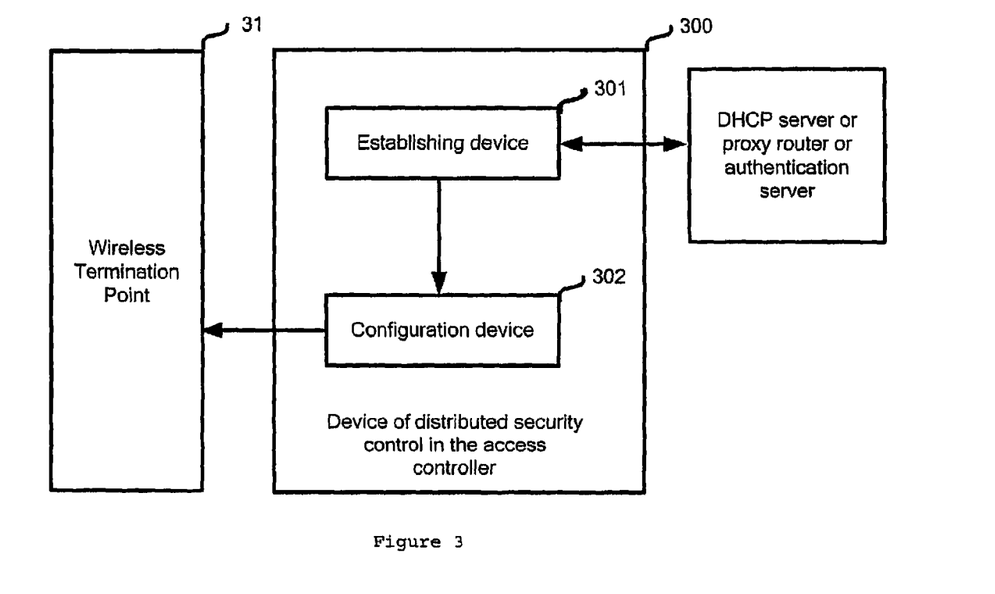
FIG. 3 illustrates a device of distributed network security control in an access controller according to one embodiment of the present invention.

FIG. 3 illustrates a device of distributed network security control in an access controller according to one embodiment of the present invention. And hereafter, detailed description is made to one embodiment of the present invention in FIG. 3 with FIG. 1 in combination.

The distributed network security control device 300 in the access controller 41 comprises an establishing device 301 and a configuration device 302.

Firstly, the establishing device 301 establishes network security control mechanism. The network security control mechanism is used in the one or more wireless termination devices to check the validity of data package from the user equipment, for example, to check the validity of the data package from the WLAN user equipment in scope of Hotspot, such that invalid data package is detected to ensure the network security.

Preferably, the network security control mechanism comprises network security checking rules and network security checking parameters, wherein, network security checking rule and network security checking parameter are as described above. When a user equipment in the WLAN in the charge of the wireless termination device 31 requests a IP address from the DHCP server by means of DHCP protocol, the establishing device 301 detects the address allocating message from the network address allocating server such as DHCP server and so forth to the user equipment, and acquires the parameters information in the network security checking parameter therefrom. For instance, when the user equipment in WLAN requests a IP address from a DHCP server by means of DHCP protocol, the access controller may detects the DHCP ACK message from DHCP server to the corresponding user equipment, and acquires the IP address allocated to the corresponding user equipment and the MAC address of the user equipment, thereby constitutes a predetermined address pair combination of network layer address (IP address) and data link layer address (MAC address) to serve as one predetermined address pair combination of the network security checking parameter as shown in Table 1. Thus, the establishment of the network security checking parameter is completed. And herein, as one embodiment, "whether or not the address pair combination checking of the source network layer address and source data link layer address of the data package is the predetermined address pair combination of the network layer address and data link layer address" may be selected as the network security checking rule, thereby constituting the network security control mechanism.

It can be readily appreciated by those skilled in the art, during establishment of the network security control mechanism by the establishing device 301, as mentioned above, the corresponding information of network security checking rule and/or the network security checking parameter can be acquired by means of manual configuration or other configuration-by-server manner. Preferably, the network security checking rule is obtained by means of manual configuration or other configuration via configuration-server, while the network security checking parameter is obtained automatically by the establishing device 301 in the course of operation of communication network system.

Subsequently, the configuration device 302 will transmit the network security control mechanism, established by establishing device 301, to the corresponding wireless termination device 31. Preferably, the configuration device 302 transmits, by the CAPWAP (Control And Provisioning of Wireless Access Points) protocol message, the above network security control mechanism to the corresponding wireless termination device 31. For example, the configuration device 302 may transmit, by the CAPWAP Station Configuration Request message in CAPWAP protocol, the network security control mechanism to the wireless termination device 31. Wherein, when the network security checking parameter included in the network security control mechanism comprises an IP address, as one embodiment of that extends the current version CAPWAP protocol, the CAPWAP Station Configuration Request message comprises a message element as defined in FIG. 5, and the message element specifically comprises a 8-bit Radio ID, a 8-bit WLAN ID, a 16-bit IEEE802.11 Association Identifier (AID) and a 32-bit IP address (or a 128-bit IPv6 address incase of the IPv6 protocol).

Figure 4:
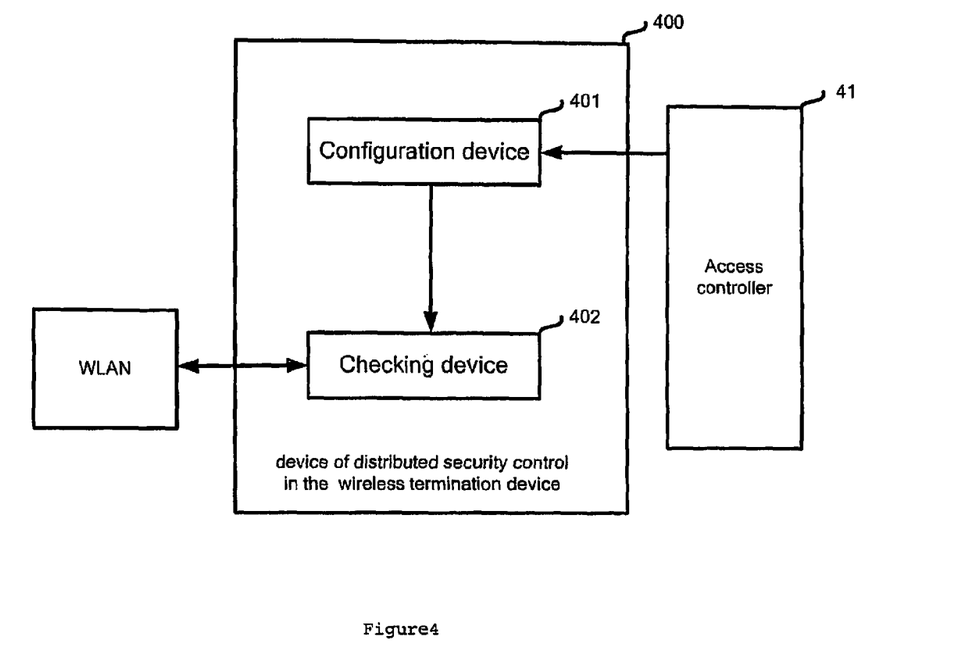
FIG. 4 illustrates a device of distributed network security control in a wireless termination device according one embodiment of to the present invention.

FIG. 4 illustrates a device of distributed network security control in a wireless termination device according to one embodiment of the present invention. And hereafter, detailed description is made to the embodiment of the present invention in FIG. 4 with FIG. 1 in combination.

The device 400 of distributed network security control in the wireless termination device 31 comprises a configuration device 401 and a checking device 402.

Firstly, the configuration device 401 receives the network security control mechanism from the access controller 41. Preferably, the network security control mechanism comprises network security checking rules and network security checking parameters, wherein, the network security checking rule and the network security checking parameter is as described above. In addition, preferably, the configuration device 401 receives the CAPWAP message from access controller 41, and acquires the corresponding network security control mechanism therefrom. For example, it receives the network security control mechanism by CAPWAP Station Configuration Request message in the CAPWAP protocol, wherein, when the network security checking parameter included in the network security control mechanism comprises IP address, as one embodiment that extends the current version CAPWAP protocol, the CAPWAP Station Configuration Request message comprises a message element as defined in FIG. 5, and the message element specifically comprises a 8-bit Radio ID, a 8-bit WLAN ID, a 16-bit IEEE802.11 Association Identifier (AID) and a 32-bit IP address (or a 128-bit IPv6 address incase of the IPv6 protocol).

Subsequently, the checking device 302 checks the validity of data package, received by the wireless termination device 31 from the WLAN user equipment, and if the data package is not in accord with the network security control mechanism, hence representing invalidity of the data package, then exceptional handling should be applied, for example discarding the data package.

Specifically, the checking device 302, firstly obtains, from the data package from the user equipment in WLAN, the parameter information corresponding to the data package according to the above network security checking rules and the network security checking parameters included in the network security control mechanism. For example, when the network security checking rule is "checking the address pair combination of source network layer address and source data link layer address of the data package is the predetermined address pair combination of the network layer address and data link layer address", and the network security checking parameter is as the address pair combination of the network layer address and the data link layer address shown in Table 1, the checking device 302 firstly obtains, from data package from user equipment, the source IP address and source MAC address of the data package, and constitutes an address pair combination, namely (the source IP address of the such package, the source MAC address of data package); subsequently, it contrasts the acquired address pair combination of the data package to network security checking parameter according to the network security checking rule, if the address pair acquired from the data package is one of the predetermined address pair combination as shown in Table 1, then it is represented that the data package is in accord with the network security control mechanism such that the data package is valid, otherwise, the data package is invalid. For example, when network security checking parameter is as shown in Table 1, and the network security checking rule is "checking whether the address pair combination of source network layer address and source data link layer address of data package is a predetermined address pair combination of network layer address and data link layer address", an source IP address acquired from a data package is 172.10.112.2, and the source MAC address therefrom is 44-45-53-54-00-20, namely the parameters information of the data package is the address pair combination (172.10.112.2, 44-45-53-54-00-20) of network layer address and data link layer address, then according to the network security checking rule, it is determined that the address pair combination of data package is the same with combination 2 in the predetermined address pair combinations of network layer address and data link layer address in the network security checking parameter as shown in Table 2, thus, the data package is in accord with the network security control mechanism, hence the data package being valid. However, if the source IP address of another data package is 172.10.112.2, with the source MAC address being 44-45-53-54-00-30, namely the parameters information of the data package is the address pair combination (172.10.112.2, 44-45-53-54-00-30) of source network layer address and source data link layer address, then it is determined, according to the network security checking rule, that the address pair combination of the data package differs from any of the three predetermined address pair combinations of network layer address and data link layer address included in the network security checking parameter as shown in Table 1, thus, the data package is not in accord with the network security control mechanism, hence representing invalidity of the data package. Actually, with the checking device 302 applying above-mentioned validity-checking to the data package, the behavior of network attack from some user equipments by means of IP address embezzlement of the other user equipment(s) and sending numerous IP packages can be effectively prevented. That is, only those data packages of which the address pair combinations of IP address and MAC address is the same with the predetermined address pair combination could go through the wireless termination device 31 and be forwarded to the network device such as the access controller 41 and so forth, thus achieving the goal of IP address anti-spoofing.

Additionally, the checking device 302 may acquire, from data package from the user equipment, not only the parameter of the source IP address, but also the parameters of TCP/UDP port number, destination IP address, destination MAC address and so forth, and during implementation of the present invention, one or the combination of a plurality of the parameters may be selected according to different objective of network security control.

The embodiments of the present invention have been described above. It is understandable by those skilled in the art that the present invention is not limited to the above specific embodiments, and various modifications or amendments can be made without departing from the scope and spirit of the scope of the attached claims. The solution of the present invention can be implemented by either software or hardware.

What is claimed is:

1. A method for distributed security control in a communication network system, said communication network comprising a network controller, one or more second network devices, and one or more user equipment, the method comprising:

dynamically establishing, at said network controller, a network security control mechanism by,
acquiring one or more address pair combinations of network layer addresses and data link layer addresses, said acquiring being based on detecting Dual Host Configuration Protocol (DHCP) acknowledgement messages sent from at least one DHCP server of at least one address allocating server to said one or more user equipment, and
dynamically changing a security checking rule and a network security checking parameter for checking a validity of a data package from said one or more user equipment on said one or more second network devices, the network security checking parameter comprising said one or more address pair combinations of network layer addresses and data link layer addresses; and
sending, via a Control and Provisional Wireless Access Points (CAPWAPI protocol message, said network security mechanism to one or more wireless termination devices associated with said one or more second network devices, said one or more wireless termination devices checking the validity of said data package from said one or more user equipment according to said network security control mechanism and discarding said data package if said data package is not in accord with said network security control mechanism.

2. The method of claim 1, wherein said network security checking parameter further comprises at least one of:
a network layer address parameter;
a port number parameter;
an address pair combination of a network layer address and a data link layer address parameter of said data package; and
a combination of the network layer address parameter and port number parameter.

3. The method of claim 2, wherein said network security checking rule comprises:
checking if an address pair combination of a source network layer address and a source data link layer address of said data package corresponds to one of said one or more address pair combinations of network layer addresses and data link layer addresses, wherein the checking by said one or more second network devices further comprises:
acquiring the address pair combination of the source network layer address and the source data link layer address of said data package,
determining if the address pair combination of the source network layer address and the source data link layer address of said data package is one of said one or more address pair combinations of network layer addresses and data link layer addresses, and
discarding said data package if not.

4. A method, in a network controller of a communication network system, for instructing one or more second network devices of said communication network system to perform distributed security control, said communication network system further comprising one or more user equipment, wherein, the method comprises:
dynamically establishing, at said network controller, a network security control mechanism by,
acquiring one or more address pair combinations of network layer addresses and data link layer addresses, said acquiring being based on detecting Dual Host Configuration Protocol (DHCP) acknowledgement messages sent from at least one DHCP server of at least one address allocating server to said one or more user equipment, and
dynamically changing a security checking rule and a network security checking parameter for checking a validity of a data package from said one or more user equipment on said one or more second network devices, the network security checking parameter comprising said one or more address pair combinations of network layer addresses and data link layer addresses; and
sending via a Control and Provisional Wireless Access Points (CAPWAP) protocol message, said network security mechanism to one or more wireless termination devices associated with said one or more second network devices.

5. The method of claim 4, wherein the network security checking parameter further comprises at least one of:
a network layer address parameter;
a port number parameter;
an address pair combination of a network layer address and a data link layer address parameter of said data package; and
a combination of the network layer address parameter and port number parameter.

6. The method of claim 5, wherein said network security checking rule comprises;
checking if an address pair combination of a source network layer address and a source data link layer address of said data package corresponds to one of said one or more address pair combinations of network layer addresses and data link layer addresses.

7. The method of claim 6, wherein said communication network system comprises a centralized wireless network,
said network controller comprises an access controller,
said one or more second network devices comprises a wireless termination device, and
said sending sends the said network security mechanism by said access controller.

8. A method, in a second network device of a communication network system, for performing distributed security control, wherein, said communication network further comprises a network controller, one or more said second network devices, and one or more user equipment, wherein, the method comprises:
Receiving via a Control and Provisional Wireless Access Points (CAPWAP) protocol message, a network security control mechanism from said network controller;
checking, according to said network security control mechanism, a validity of a data package from said one or more user equipment, said network security control mechanism being dynamically established by,
acquiring one or more address pair combinations of network layer addresses and data link layer addresses, said acquiring being based on detecting Dual Host Configuration Protocol (DHCP) acknowledgement messages sent from at least one DHCP server of at least one address allocating server to said one or more user equipment, and
dynamically changing a security checking rule and a network security checking parameter, the network security checking parameter comprising said one or more address pair combinations of network layer addresses and data link layer addresses; and
discarding said data package if said data package is not in accord with said network security control mechanism.

9. The method of claim 8, wherein network security checking parameter further comprises at least one of:
a network layer address parameter;
a port number parameter;
an address pair combination of network layer address and data link layer address parameter of said data package; and
a combination of the network layer address parameter and port number parameter.

10. The method of claim 9, wherein said network security checking rule comprises:
checking if an address pair combination of a source network layer address and a source data link layer address of said data package corresponds to one of said one or more address pair combinations of a network layer addresses and a data link layer addresses; and
wherein the checking further comprises:
acquiring the address pair combination of source network layer address and source data link layer address of said data package,
determining if the address pair combination of source network layer address and source data link layer address of said data package is one of said one or more address pair combinations of network layer addresses and data link layer addresses, and discarding said data package if the address pair combination of source network layer address and source data link layer address of said data package is not one of said one or more address pair combinations of network layer addresses and data link layer addresses.

11. The method of claim 10, wherein said communication network system comprises centralized wireless network, said network controller comprises an access controller, said one or more second network devices comprises one or more wireless termination devices, said receiving includes receiving said network security control mechanism via the Control and Provisioning of Wireless Access Points (CAPWAP) protocol message from said access controller;

said checking further comprises:

acquiring, by said wireless termination device from the data package sent by said one or more user equipment, the address pair combination of source network layer address and source data link layer address of said data package, determining if the address pair combination of source network layer address and source data link layer address of said data package is either one of said one or more address pair combinations of network layer addresses and data link layer addresses, and discarding said data package if not.

12. A method for distributed security control in a communication network system, said communication network comprising a centralized wireless network, a network controller including an access controller, one or more wireless termination devices, and one or more user equipment, the method comprising:

dynamically establishing, at said access controller, a network security control mechanism for checking a validity of a data package from said one or more user equipment on said one or more wireless termination devices, said network security control mechanism including at least one network security checking rule and at least one network security checking parameter, the at least one network security checking parameter comprising one or more address pair combinations of network layer addresses and data link layer addresses, said dynamic establishing of the network security mechanism including acquiring said one or more address pair combinations of network layer addresses and data link layer addresses, said acquiring being based on detecting Dual Host Configuration Protocol (DHCP) acknowledgement messages sent from at least one DHCP server of at least one address allocating server to said one or more user equipment, and sending, by said access controller, a message of a Control and Provisional Wireless Access Points (CAPWAP) protocol including said network security control mechanism to said one or more wireless termination devices, said one or more wireless termination devices checking the validity of said data package from said one or more user equipment according to said network security control mechanism by detecting an address pair combination of source network layer address and source data link layer address of said data package, and determining if the address pair combination of source network layer address and source data link layer address of said data package is one of said one or more address pair combinations of network layer addresses and data link layer addresses, and discarding said data package if said data package is not in accord with said network security control mechanism.

13. A method, in a second network device of a communication network system, for performing distributed security control, wherein, said communication network further comprises a network controller, one or more said second network devices, and one or more user equipment, wherein, the method comprises:

Receiving, via a Control and Provisional Wireless Access Points (CAPWAP) protocol message, a network security control mechanism from said network controller, said network security control mechanism including at least one network security checking rule and at least one network security checking parameter, the at least one network security checking parameter comprising one or more address pair combinations of network layer addresses and data link layer addresses, said one or more address pair combinations being acquired based on detecting Dual Host Configuration Protocol (DHCP) acknowledgement messages sent from at least one DHCP server of at least one address allocating server to said one or more user equipment;

checking, according to said network security control mechanism, a validity of a data package from said one or more user equipment by detecting an address pair combination of source network layer address and source data link layer address of said data package, the checking being based on determining if the address pair combination of source network layer address and source data link layer address of said data package is one of said one or more address pair combinations of network layer addresses and data link layer addresses, and discarding said data package if said data package is not in accord with said network security control mechanism.

* * * * *